Figures 1, 2:
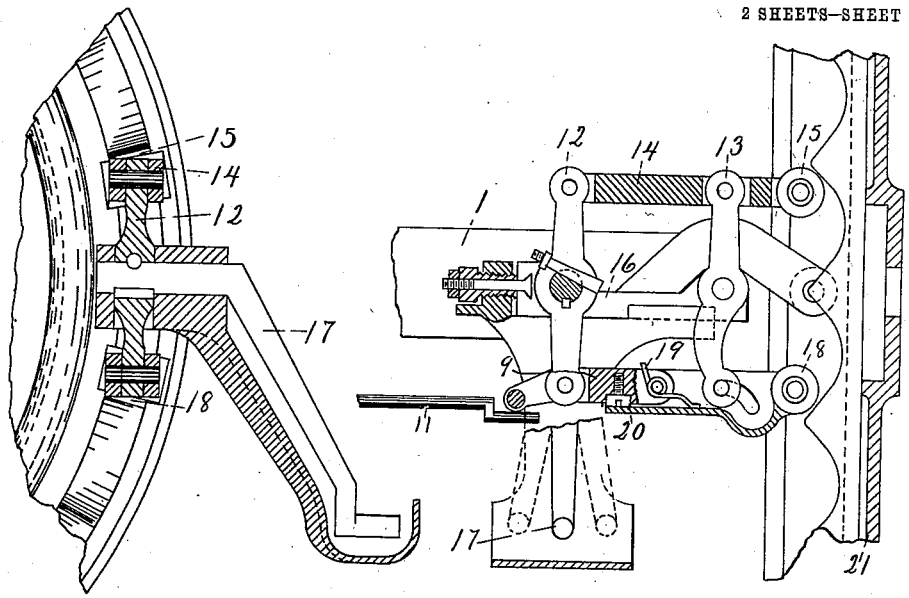

S. P. SHELVIK.
GEARLESS MOWING MACHINE.
APPLICATION FILED NOV. 22, 1913.

1,095,529.

Patented May 5, 1914.
2 SHEETS—SHEET 1.

S. P. SHELVIK.
GEARLESS MOWING MACHINE.
APPLICATION FILED NOV. 22, 1913.
1,095,529.
Patented May 5, 1914.
2 SHEETS—SHEET 2.
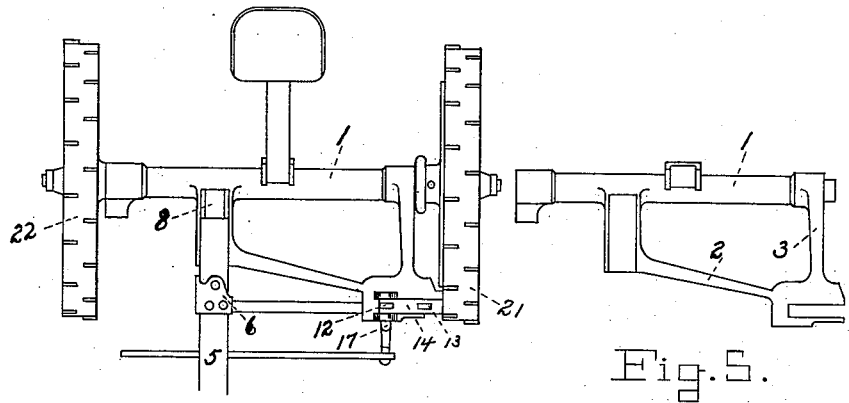
Fig. 4.
Fig. 5.
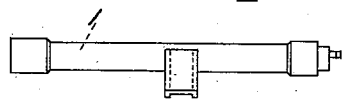
Fig. 2.
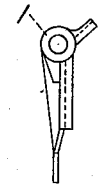
Fig. 6.
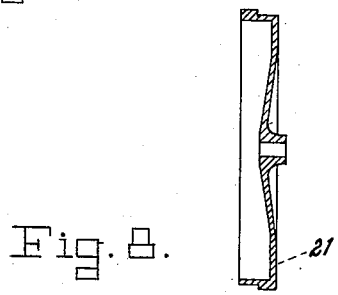
Fig. 8.
WITNESSES
W. W. French
B. H. French
INVENTOR
Sivert P. Shelvik
BY
Charles Albert French
ATTORNEY

UNITED STATES PATENT OFFICE.

SIVERT P. SHELVIK, OF STOUGHTON, WISCONSIN, ASSIGNOR OF ONE-THIRD TO THOMAS LOFTHUS, OF MADISON, WISCONSIN.

GEARLESS MOWING-MACHINE.

1,095,529.  Specification of Letters Patent.  Patented May 5, 1914.

Application filed November 22, 1913. Serial No. 802,579.

*To all whom it may concern:*

Be it known that I, SIVERT PETERSON SHELVIK, a subject of the King of Norway, residing at Stoughton, in the county of Dane and State of Wisconsin, have invented certain new and useful Improvements in Gearless Mowing-Machines, of which the following is a specification.

My invention relates to mowing machines in which reciprocating sickles or cutters are used and driven from traction wheels.

The objects of my invention are to eliminate all gear wheels from the construction, to obtain the necessary reciprocating motion by means of levers and rollers thereby reducing the loss of power by friction, to produce a cheaper and more durable machine. and to stop reciprocating parts and sickle when the cutter bar is elevated to pass over an obstacle.

Additional objects of the invention will appear in the following complete specification, in which the preferred form of the invention is disclosed.

In the drawings similar characters of reference indicate corresponding parts in all the views, in which—

Figure 3:
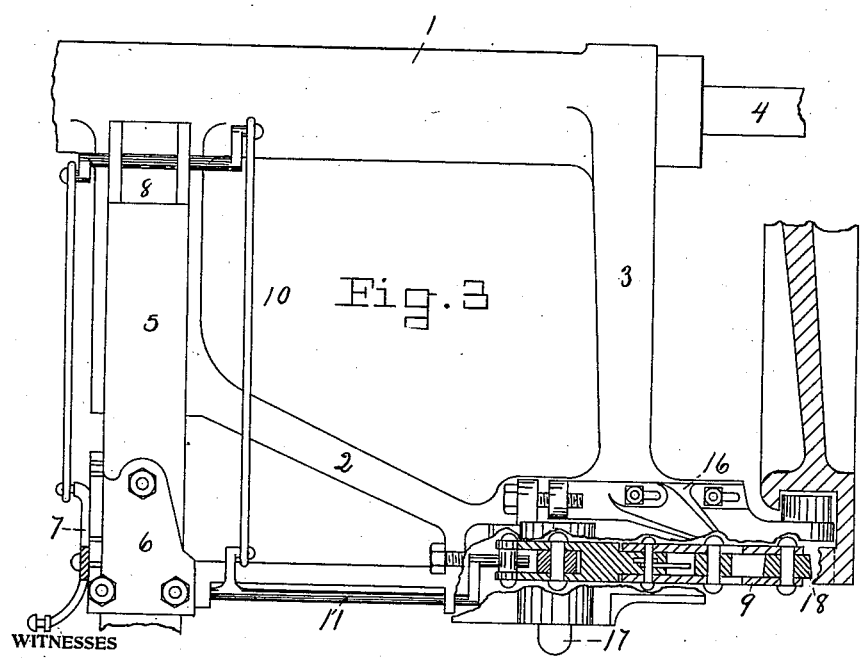

Figure 1, is a front elevation of the reciprocating mechanism of my device partly in section, Fig. 2, is a view of the inside of the left wheel showing the reciprocating mechanism partly in section, Fig. 3, is a plan of portions of the machine showing the connection between the elevating lever and the bar 9, Fig. 4, is a plan of the machine, Fig. 5, a plan of main frame, Fig. 6, a left side elevation of same and Fig. 7, a rear elevation. Fig. 8, is a vertical section through the main drive wheel.

The main frame 1, and the forwardly and diagonally projecting integral arms, 2, and 3, terminating in a flat elongated plate parallel to the shaft line of the frame forms the main supports of my machine. The said frame is bored to receive the wheel shaft 4, which passes through its entire length. Adjacent the right end of the frame integral therewith at the point where the diagonal arm 2, intersects the same, is a forwardly projecting bracket with vertical flanges on both sides to receive and support the rear end of the pole 5. The wheel shaft 4, is of cold rolled shafting of a suitable length to pass through the main frame and extend beyond the same sufficiently to permit of the two drive wheels, 21, and 22, being secured thereto by means hereinafter described. The pole 5, is secured to the frame by bolts in the usual manner and at its rear end and on the top of the same is bolted a plate, 8, through which is disposed a shaft carrying a rocker arm on both ends, one arm of which attaches by means of a rod, to the elevating lever 7, and the other arm is attached to the bar 9, of the reciprocating mechanism by means of the rod 10, and oscillating shaft, 11.

The reciprocating movement of my machine is produced by the following mechanism. A yoke 16 flat on the bottom to adjustably attach to the main frame by bolts disposed in slotted holes is provided with bearings for carrying the pitman driving, oscillating arm 17, on which is disposed rocker arm 12. A distance from and in vertical alinement therewith is rocker arm, 13, which is also journaled in yoke 16. The upper ends of arms 12 and 13, are pivotally connected to each other by the bar 14, on the forward end of which is rotatively disposed roller 15. The lower ends of arms 12 and 13, are pivotally connected to each other by the bar 9, which is provided with a hinge joint near its longitudinal center and the two ends of which are kept in longitudinal alinement by the spring 19, and adjusted by means of screw 20. The outer half of bar 9, has a roller 18, revolubly disposed adjacent its outer end which is a duplicate of roller 15, these rollers aforementioned, roll upon the face of a corrugated annulus which is integral with a spoked wheel rotatively disposed on the main shaft of the machine and is surrounded by an outer rim or traction wheel also disposed on the main shaft. The two wheels are operatively connected to each other by the usual pawl and ratchet mechanism employed in mower wheels and their companion hubs. The reciprocating motion it is obvious being produced by the corrugated annulus acting on the rollers 15, and 18, which are so disposed, that when one is at the apex of the corrugations the other is in the bottom of the second one therefrom. When the cutter bar is down in working position the reciprocating mechanism is in contact with the wheel as shown in Fig. 1, but when the elevating lever is thrown back to raise the cutter bar it, by means of its rod connections causes the two arm lever to throw back and the shaft 11, to force down the rear end of bar 9, thereby throwing backward roller 18, for a sufficient distance to disengage the two rollers from the annular corrugated driving mechanism.

What I claim is—

In a mowing machine comprising driving wheels, a frame, a cutter bar, a shoe, a drive wheel provided with a corrugated annular member in working contact with rollers, said rollers disposed on reciprocating bars, rocker arms connecting said bars, a yoke in which said rocker arms are pivotally mounted, one of said reciprocating bars being hinged interminate its length, a spring for alining the said hinged bar, a set screw for adjusting the alinement, a lever with rods attached thereto, an oscillating shaft, rods connecting said shaft to the lever, said shaft engaging the rear end of hinged bar when lever is thrown back substantially as described and set forth.

In testimony whereof I affix my signature in the presence of two witnesses.

SIVERT P. SHELVIK.

Witnesses:
GULLICK PETERSON,
CHAS. A. FRENCH.

---

Copies of this patent may be obtained for five cents each, by addressing the "Commissioner of Patents, Washington, D. C."

Correction in Letters Patent No. 1,095,529.

It is hereby certified that in Letters Patent No. 1,095,529, granted May 5, 1914, upon the application of Sivert P. Shelvik, of Stoughton, Wisconsin, for an improvement in "Gearless Mowing Machines," an error appears in the printed specification requiring correction as follows: Page 2, lines 13-14, for the word "interminate" read *intermediate;* and that the said Letters Patent should be read with this correction therein that the same may conform to the record of the case in the Patent Office.

Signed and sealed this 7th day of July, A. D., 1914.

[SEAL.]

R. F. WHITEHEAD,
*Acting Commissioner of Patents.*